(12) United States Patent
Finlaw et al.

(10) Patent No.: US 7,503,573 B2
(45) Date of Patent: Mar. 17, 2009

(54) SKATEBOARD CARRIER FOR BICYCLE

(76) Inventors: Joseph P. Finlaw, 4588 Greenlawn Dr., Stow, OH (US) 44224; Thomas M. Finlaw, 3592 Williamson Rd., Stow, OH (US) 44224

( * ) Notice: Subject to any disclaimer, the term of this patent is extended or adjusted under 35 U.S.C. 154(b) by 377 days.

(21) Appl. No.: 11/368,161

(22) Filed: Mar. 3, 2006

(65) Prior Publication Data

US 2007/0205242 A1    Sep. 6, 2007

(51) Int. Cl.
| B62J 39/00 | (2006.01) |
| B62J 7/00 | (2006.01) |
| B62J 11/00 | (2006.01) |
| B62J 9/00 | (2006.01) |
| B62J 7/06 | (2006.01) |

(52) U.S. Cl. ............ 280/202; 280/288.4; 224/412; 224/419; 224/420; 224/426; 224/441; 224/446; 224/448; 224/450; 224/451; 224/453; 224/454; 224/456; 224/428; 224/440; 224/443; 224/452

(58) Field of Classification Search ............ 280/288.4, 280/202; 224/412, 419, 420, 426, 441, 446, 224/448, 450, 451, 453, 454, 456, 428, 440, 224/443, 452
See application file for complete search history.

(56) References Cited

U.S. PATENT DOCUMENTS

| 3,193,232 | A | * | 7/1965 | Hatcher | 248/231.81 |
| 4,193,525 | A | * | 3/1980 | Sommers | 224/414 |
| 4,337,883 | A | | 7/1982 | Pate | |
| 4,429,818 | A | | 2/1984 | Patterson et al. | |
| 4,790,460 | A | | 12/1988 | Harper, Jr. | |
| 5,127,562 | A | * | 7/1992 | Zane et al. | 224/446 |
| 5,639,001 | A | * | 6/1997 | Brady | 224/449 |
| 6,010,051 | A | | 1/2000 | Callanan | |
| 6,062,053 | A | * | 5/2000 | Ho | 70/233 |
| 6,540,238 | B2 | | 4/2003 | Yang | |
| 6,799,707 | B2 | | 10/2004 | Gibson | |
| 7,216,789 | B2 | * | 5/2007 | Caradimos | 224/276 |
| 2005/0092798 | A1 | * | 5/2005 | Borgman et al. | 224/420 |
| 2005/0218171 | A1 | | 10/2005 | Bellerive | |
| 2005/0258208 | A1 | * | 11/2005 | Pickett | 224/427 |
| 2006/0208023 | A1 | * | 9/2006 | Manning | 224/420 |
| 2007/0164532 | A1 | * | 7/2007 | Nemec et al. | 280/202 |

OTHER PUBLICATIONS

Fig. 10 Prior Art Device purchased commercially in 2005.

* cited by examiner

*Primary Examiner*—Christopher P Ellis
*Assistant Examiner*—John R Olszewski
(74) *Attorney, Agent, or Firm*—Hudak, Shink & Farine Co. LPA

(57) ABSTRACT

A carrier device that is adapted to be attached to a bicycle or other transport vehicle for transporting preferably a skateboard or other equipment. One portion of the carrier device such as a clamp member can be connected to a bicycle, preferably the handlebar thereof. A skateboard is securely and firmly connected to a board rack or bracket of the carrier device by a securing mechanism. The board bracket can accommodate skateboards of numerous sizes or widths. In a preferred embodiment, the carrier device and skateboard are mounted so that balance of the bicycle is maintained and the rider's hands remain free to control the handlebar of the bicycle.

16 Claims, 10 Drawing Sheets

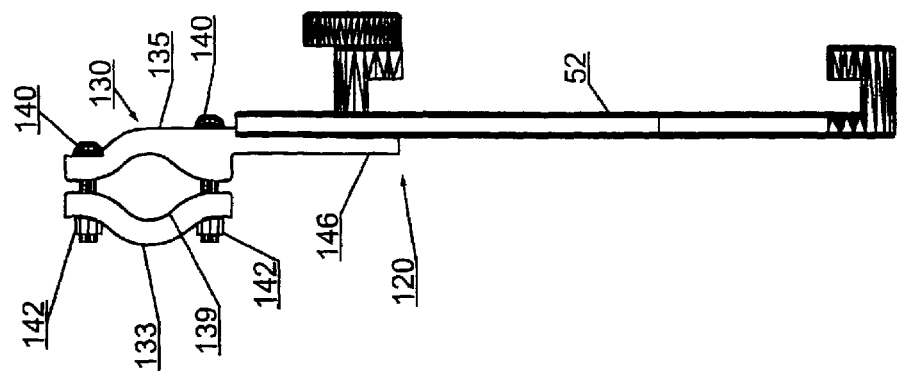
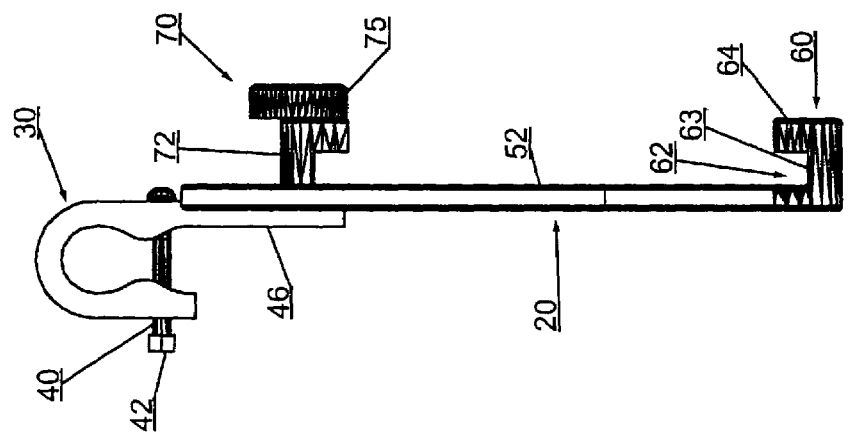

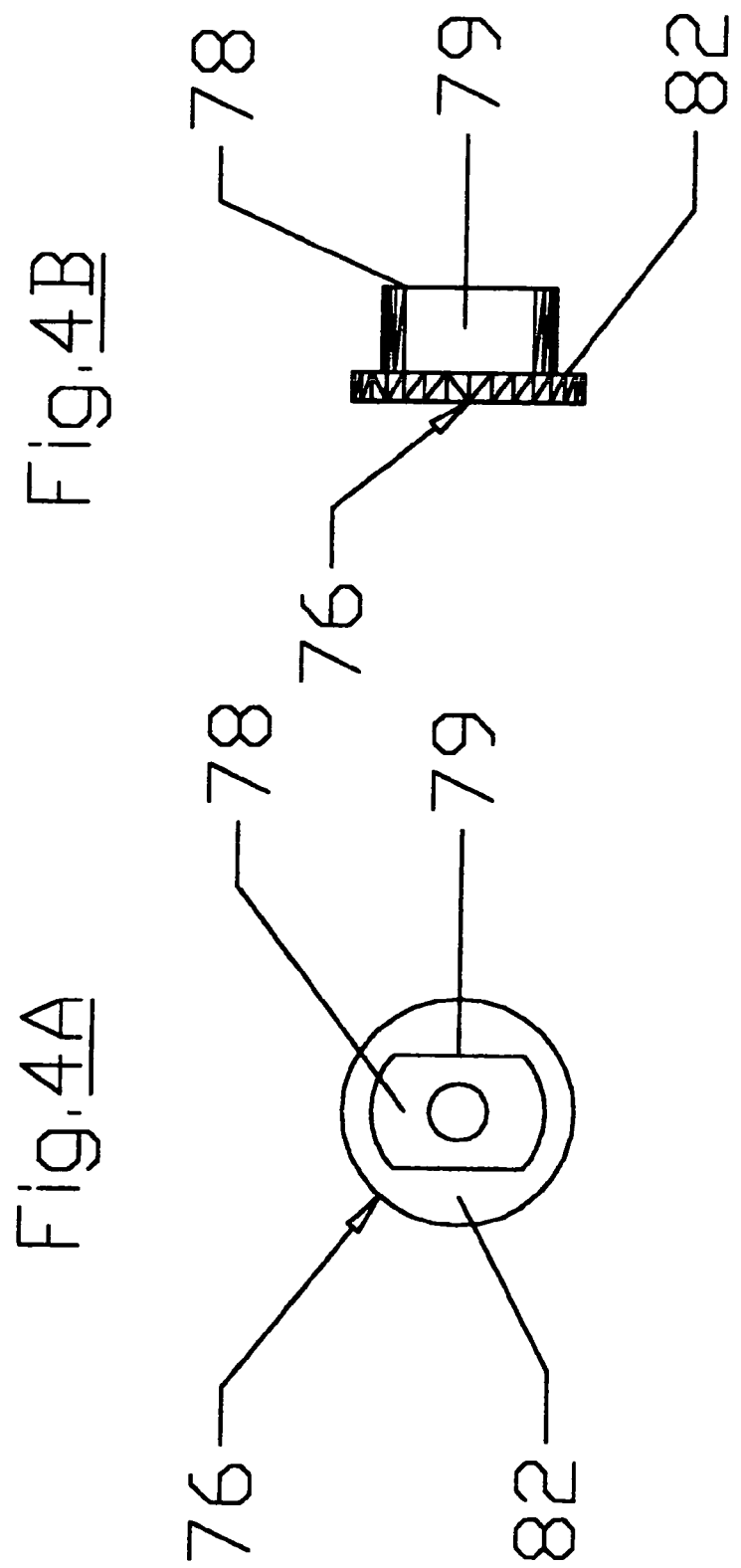

SKATEBOARD CARRIER FOR BICYCLE

FIELD OF THE INVENTION

The present invention relates to a carrier device that is adapted to be attached to a bicycle or other transport vehicle for transporting preferably a skateboard or other equipment. One portion of the carrier device such as a clamp member can be connected to a bicycle, preferably the handlebar thereof. A skateboard is securely and firmly connected to a board rack or bracket of the carrier device by a securing mechanism. The board bracket can accommodate skateboards of numerous sizes or widths. In a preferred embodiment, the carrier device and skateboard are mounted so that balance of the bicycle is maintained and the rider's hands remain free to control the handlebar of the bicycle.

BACKGROUND OF THE INVENTION

Skateboarding is a popular recreational past time, especially among kids, adolescents and young adults. As kids, adolescents or young adults often do not own cars, they must find a way to transport their skateboard to an appropriate skateboarding area, such as a skateboard park, a park, or other destinations. Many young people ride their bicycle or other mode of transportation to a desired area in order to use their skateboard. Carrying the skateboard or other object, such as in one hand, can be unsafe and dangerous as only one free hand is available to control the bicycle or other transport vehicle.

Various devices have been developed to aid a person in carrying objects while riding a bicycle so that a person's hands are free to control the bicycle or the like. Some of the devices have been designed to be connected to the bicycle, while others have been proposed that attach a person, such as a backpack, belt or the like.

U.S. Pat. No. 4,337,883 relates to a skateboard holder which reportedly can be removably attached to the belt of a wearer for transporting a skateboard. More specifically, a skateboard holder is disclosed having a rectangularly-shaped hanger, formed of a flat material such as leather, in which two vertically oriented slits are formed in an upper portion thereof for attachment to a belt. Attached to two side portions of the hanger are two straps having fastening means at their end portions so that a loop defined by the straps and hanger can be formed. The straps are formed so that each one attaches to the hanger along a predetermined length of a vertical edge thereof. Each strap tapers down so that its end portion is narrower than the predetermined length. This reportedly allows the weight of the skateboard to be supported while at the same time allowing the skateboard to be positioned as low as possible for wearer comfort. A vertically oriented skateboard having its upper wheels extending outwardly is positioned against the hanger so that a loop formed by the two straps is under the outwardly-extending upper wheels, thereby providing support for the skateboard as it is transported. In a further embodiment of the invention, a single strap extending from one side portion of the holder is provided. The end portion of the single strap is attached to the other side of the hanger so as to form a loop for holding the skateboard as in the first embodiment.

U.S. Pat. No. 4,429,818 relates to a carrier rack for bicycles comprising a load-supporting platform composed of a peripheral frame and at least one cross piece that has internal threads at each end. The upper end of each of a pair of struts is clamped between the cross piece and the respective side of the frame by a screw that passes through holes in the side portion and the upper end of the strut and is threaded into the end portion of the cross piece. A rear carrier rack includes a pair of front end connecting bars attached to the platform for adjustment fore and aft. Each connecting bar is a flat metal band, the major portion of which is oriented flatwise to the platform. The front end portion of each connecting bar is twisted approximately 90° so that it lies flatwise to the seat stays. Each connecting bar is connected to a seat stay by an offset ring clamp.

U.S. Pat. No. 4,790,460 relates to a carrier for transport of a skateboard which leaves use of the hands free, includes a flexible resiliently deformable pad body with front and back faces configured to cover substantially the upper back of the bearer. The lateral sides of the pad body have pairs of attachment members to which cinching straps removably attach across the back face to cinchingly loop around the axle support brackets of a skateboard vertically oriented and positioned with its topside against the back face of the pad body and its wheels extending outwardly. The lateral edges of the pad body at the attachment member and the attachment members are drawn tightly against the lateral margins to restrain lateral movement of the skateboard, vertical movement of which is restrained by the loops about the axle support brackets. A plurality of lateral attachment member pairs reportedly permits vertical adjustment of the board on the pad body and supplementarily provides for attachment of skateboarding accessory articles. Compact articles may be accommodated in a back face pocket.

U.S. Pat. No. 6,010,051 relates to an apparatus for releasably retaining a recreational board, such as a skateboard, snowboard or skis. In one embodiment, the apparatus has a main body with a front portion to which one or more straps is attached, and a rear portion to which a pair of opposing flaps is attached. The flaps extend from the main body such that the second flap overlaps the first flap when the two are wrapped in opposite directions around the recreational board. The overlapping surfaces of the two flaps are secured together to releasably retain the board. A connector is fixed to the second flap and extends from the rear portion of the carrier to the front portion of the carrier where it terminates in a grip. A force exerted on the grip subjects the connector to tension, causes the second flap to be separated from the first flap, and releases the board. In another embodiment, the connector extends through apertures in the front and rear portions of the main body. In still another embodiment, the connector extends through both the apertures and a tubular sleeve that is either attached to or incorporated within the strap.

U.S. Pat. No. 6,540,238 relates to a coupling device that is provided with one end secured to the front end of a skate board and the other end secured to the rear axle of a baby carriage. The coupling device includes a coupler, a belt, a buckle article and a mounting block. The coupler is divided into two halves. Both ends of each half are provided with screwing holes. Two halves of the coupler are screwed to the rear axle of a baby carriage, the mounting block is screwed to the front end of a skate board, and one end of the belt is connected with the buckle article. After being penetrated through the buckle ring of the mounting block and encircling the center of the coupler, the other end of the belt is penetrated through the buckle article and fastened by the pressing piece of the buckle article.

U.S. Pat. No. 6,799,707 relates to devices for reportedly carrying, storing, and deterring the theft of elongate recreational boards such as snowboards, skis, skateboards, surfboards, sailboats and the like.

U.S. patent application Publication No. US 2005/0218171 relates to a method or process reportedly allowing a skateboard to be attached to the bottom of a backpack. This provides the carrier of the backpack to either carry the backpack and skateboard together as one unit, or will also allow the carrier to remove the skateboard and ride it, while carrying the backpack on their back.

U.S. patent application Publication No. US 2005/0258208 relates to a carrying apparatus for transporting sports or activity equipment, such as a skateboard, in-line skates, a surfboard and/or the like, which attaches to a bicycle is disclosed. The carrying apparatus has a generally Y-shaped holding member and an adapter. The holding member holds a skateboard, in-line skates and/or a surfboard, while the adapter secures the carrying apparatus to a bicycle. The holding member preferably has a first extension member which extends into a first prong and a second extension member which extends into a second prong. The prongs connect at an adjoining central point. The adapter preferably has a first side portion and a second side portion, each of which may have a generally C-shaped portion. An inner wall of the first side portion and the second side portion fit around a seat support bar of a bicycle.

In the drawings, FIG. 10 shows an embodiment of a prior art apparatus reportedly for use in carrying a skateboard.

In view of the prior art, a need still exists for a carrier device adapted to carry a piece of equipment such as a skateboard or the like while riding a bicycle, moped, motor bike, scooter, or the like without having the rider carry such equipment.

SUMMARY OF THE INVENTION

The present invention relates to a carrier device adapted to be attached to a bicycle or other transport vehicle. The carrier includes a clamp member that attaches or otherwise secures the carrier device to the bicycle. In a preferred embodiment, the clamp member is connected to the handlebar of the bicycle, on opposite sides of a center wheel tube post if present.

The carrier device includes a board rack or bracket to which the skateboard or other object is attached. The carrier device also includes a frame adapted to support the board. The frame includes a base having a board seat that accepts skateboards of many different thicknesses. The skateboard is secured to the frame by an adjustable securing mechanism that accommodates skateboards of many different widths.

Accordingly, it is an object of the present invention to provide a carrier device for carrying an object such as a skateboard or the like, with the carrier device being attached to a bicycle or the like without a person having to carry the skateboard. A further object of the present invention is to provide an efficient and safe means for carrying a skateboard while a person is riding a bicycle so that the hands of the person are free to control the bicycle.

In view of the objects of the present invention, a skateboard carrier device is provided for a bicycle, comprising a clamp member adapted to connect the carrier device to a bicycle; a substantially planar frame connected to the clamp member, wherein the frame includes a seat connected thereto and adapted to receive and hold a side of the skateboard; and a securing mechanism adjustably secured to an aperture of the frame, wherein the securing mechanism is capable of being secured at a plurality of positions with respect to the frame in order to secure skateboards of different configurations, and wherein the securing mechanism includes a securing member having an aperture and a fastener that extends through the securing member aperture and frame aperture and connected the securing mechanism to the frame.

A further object of the present invention provides a carrier device for a bicycle or transport vehicle, comprising a clamp member adapted to be connected to the bicycle or transport vehicle; a frame having a first end and a second end, wherein a seat is connected to the first end of the frame, wherein the seat includes a spacer connected to the frame and a retainer connected to the spacer and spaced a distance from the frame by the spacer, wherein the retainer has a height greater than the spacer, wherein the seat forms an opening capable of receiving a portion of an object, wherein the second end of the frame includes an aperture to which a securing mechanism is secured, wherein the securing mechanism is capable of being secured to a plurality of positions in relation to the frame utilizing the aperture, and wherein the securing mechanism is adapted to secure a second portion of the object to the carrier device.

Yet another object of the present invention is a skateboard carrier device for a bicycle, comprising a clamp member adapted to connect the carrier device to a bicycle, a frame connected to the clamp member, wherein the frame includes a seat connected thereto at a base of the frame and adapted to receive and hold the skateboard, and a securing mechanism having a T-shaped or L-shaped securing member adjustable in relation to the frame and capable of being secured to an upper portion of the frame at a plurality of different positions and adapted to accommodate skateboards of different configurations.

BRIEF DESCRIPTION OF THE DRAWINGS

The invention will be better understood and other features and advantages will become apparent by reading the detailed description of the invention, taken together with the drawings, wherein:

FIG. 3A is a side view of the carrier device illustrated in FIG. 2.

FIG. 3B is a side view of a further embodiment of the carrier device of the present invention.

FIG. 4A is a front view of a securing mechanism nut of the present invention including a slidable protrusion adjustable in a slot of the carrier device frame.

FIG. 4B is a side view of FIG. 4A.

DETAILED DESCRIPTION OF THE DRAWINGS

Figure 1:
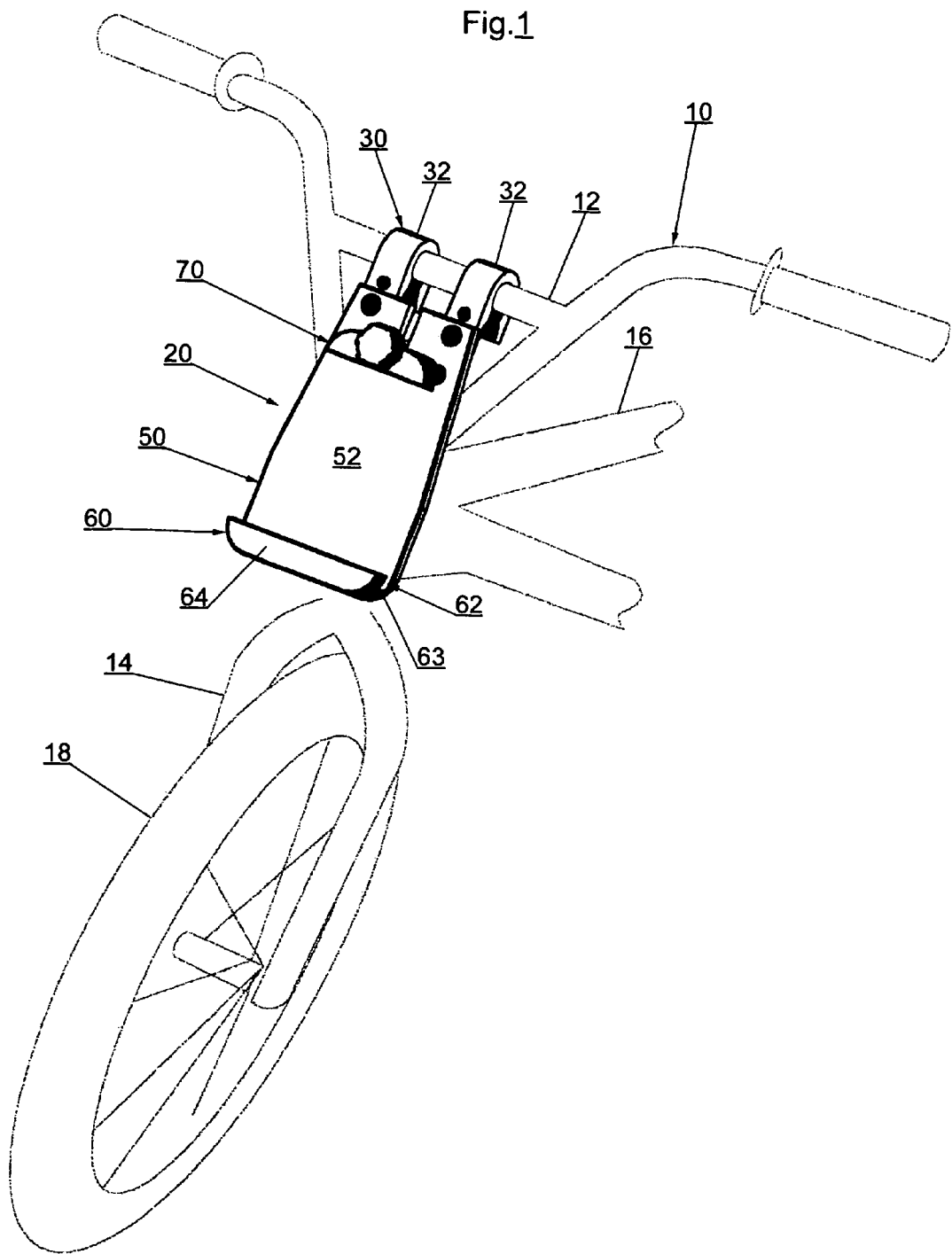
FIG. 1 is a partial perspective view of one embodiment of the carrier device of the present invention connected to a handlebar of a bicycle.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical,""up," "down," "top" and "bottom" as well as derivatives thereof (e.g., "horizontally,""downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly,""longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to FIG. 1, therein illustrated as a carrier device 20 of the present invention connected to a bicycle 10. Bicycle 10 generally includes a handlebar 12 that includes a pair of handles that can be manipulated by an operator or user to turn wheel 18 in order to steer the bicycle. Wheel 18 is generally operatively connected to handlebar 12 through wheel fork 14. Bike frame 16, through which handlebar 12 operatively extends, or is connected to, can be of any suitable design as known in the art.

While the present invention is illustrated with respect to a bicycle, it is to be understood that any similar transport devices can be utilized and carrier device 20 of the present invention can be connected thereto. Examples of other similar transport devices include, but are not limited to, mopeds, motorbikes, scooters, or ATVs.

In a preferred embodiment, as shown for example in FIG. 1, carrier device 20 is attached to the front of bicycle 10, preferably to handlebar 12, above front wheel 18.

Carrier device 20 includes a clamp member 30 adapted to be connected to a location on the bicycle 10, such as handlebar 12. Clamp member 30 secures carrier device 20 to the bicycle 10, preferably fixedly so that the carrier device 20 does not move in relation to the part of the bicycle 10 the carrier device 20 is attached to. In a preferred embodiment, the clamp member 30 includes one or more clamps 32, with two clamps 32 preferred as shown in FIG. 2.

Figure 2:
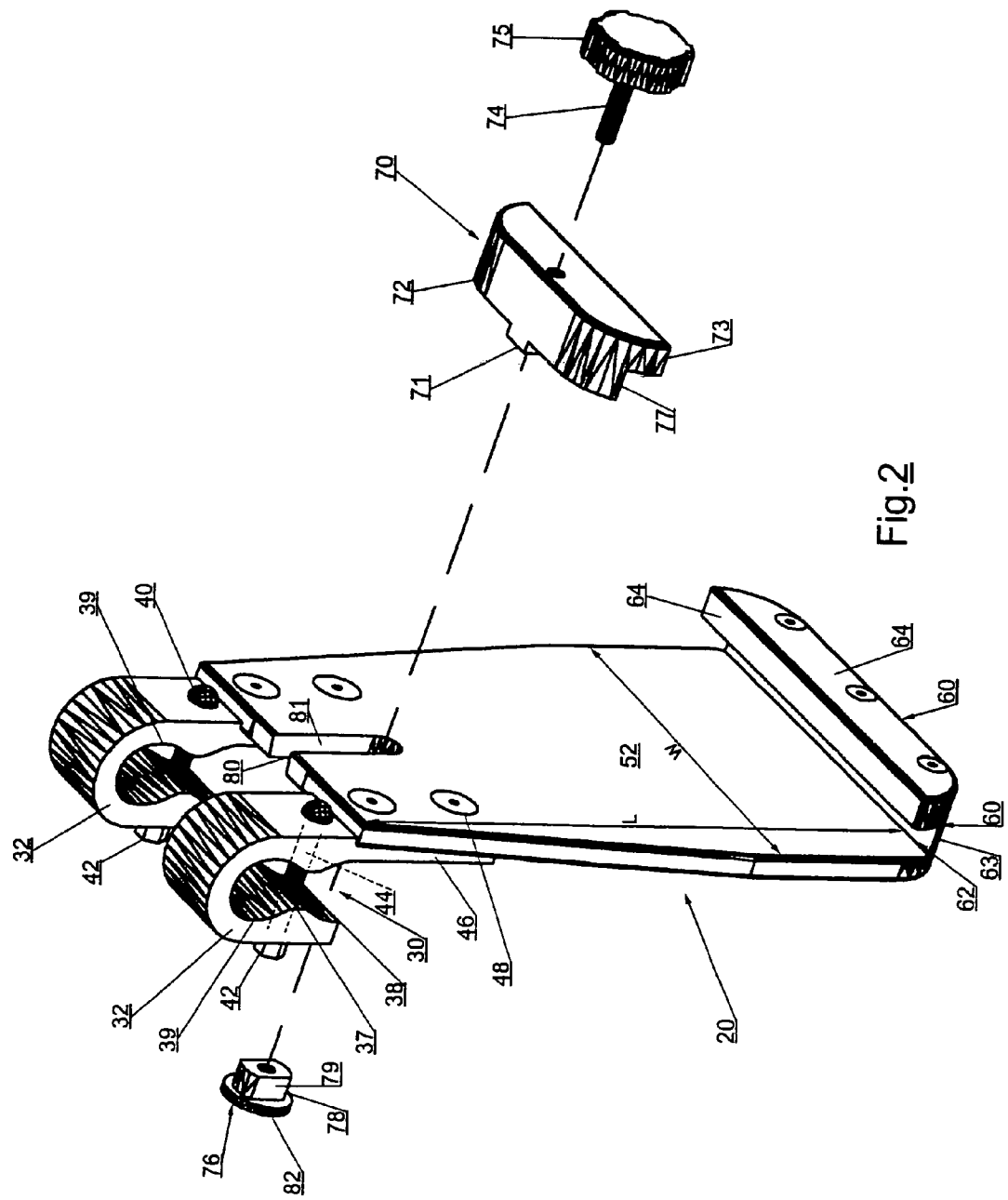
FIG. 2 is an exploded perspective view of one embodiment of a carrier device of the present invention.

As particularly illustrated in FIG. 2, clamp 32 includes an open end 38 that leads past an indentation 37 to a receiver 39. Receiver 39 has a configuration adapted to be complimentary in shape to the portion of the bicycle the carrier device 20 is attached to. The cross section of receiver 39 can be any shape or segment of a shape, including, but not limited to, circular, oblong, square, rectangular, or the like, with a substantially circular receiver preferred in order to facilitate attachment to substantially circular or cylindrical handlebars 12 of bicycle 10.

In order to attach carrier device 20 to a bicycle 10, open end 38 of clamp member 30 is inserted over the location to be secured such as handlebar 12. Handlebar 12 is pushed or otherwise moved past indentations 37 into receiver 39. Afterwards, carrier device 20 is held in a desired location and position and a fastener 40 such as a screw or bolt is inserted through a bore 44 on each side of the clamp member 30, and preferably through a nut 42, and subsequently secured.

In an alternative embodiment, as shown in FIG. 3B, the clamp member 130 of carrier device 120 includes a first half 133 and a second half 135 that, when assembled, include or form a receiver 139 complimentary to the shape of the portion of the bicycle 10 or other vehicle the carrier device 120 is to be attached to. The first and second halves 133 and 135 of the clamp member 130 are connected around the portion of the bicycle and secured with an appropriate fastening device such as a screw, nut 140 and bolt 142, weld, adhesive, or the like or combinations thereof. Clamp foot 146 connects clamp member 130 to frame 52.

Clamp 32 includes an extension, foot 46 or other portion that facilitates connection of clamp member 30 to board rack or bracket 50. In a preferred embodiment, clamp member 30 is secured to bracket 50 through one or more fasteners 48. As illustrated in FIG. 2, two fasteners 48 are preferably utilized to secure each clamp foot 46 of clamp 32 to bracket 50. Depending on the material utilized, alternative securing mechanisms such as an adhesive, welding, or the like can be utilized.

Figure 5:
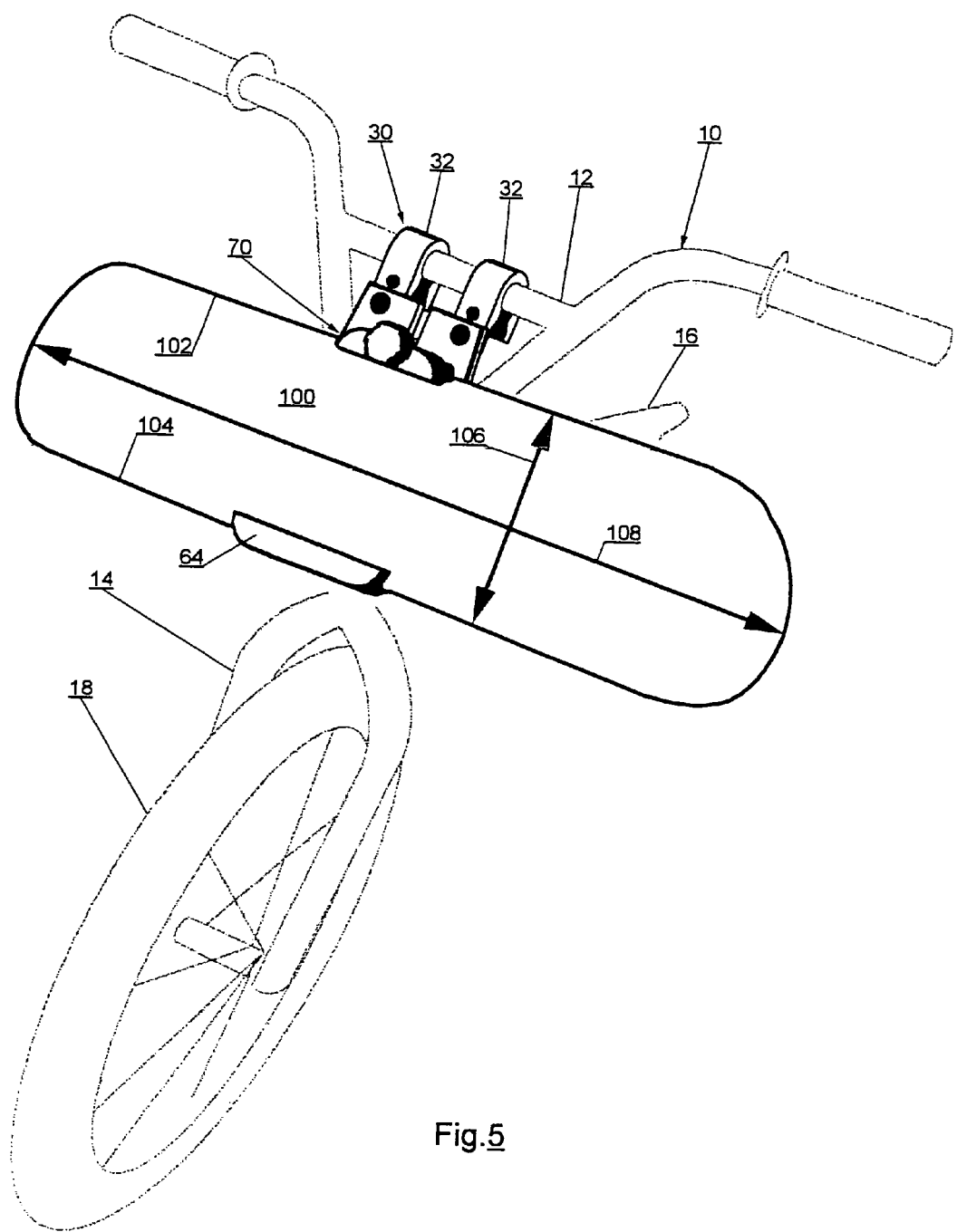
FIG. 5 is a perspective view of one embodiment of a skateboard connected to one embodiment of the carrier device of the present invention, in turn connected to a handlebar of a bicycle.

Board bracket 50 includes a frame 52, see FIG. 1, adapted to support a skateboard 100 as illustrated in FIG. 5. Generally the upper surface (or top) or lower surface (or bottom) of skateboard 100 is disposed against frame 52 when the skateboard 100 is connected in carrier device 20. Frame 52, in turn, preferably has a length, L, generally measured between spacer 63 and an upper end of frame 52, greater than the width of skateboard 100, i.e. between sides 102, 104, to be connected therein. Frame 52 has a maximum length generally from about 4 to about 12 inches, desirably from about 6 to about 10 inches, and preferably from about 6 to about 9 inches.

Figure 9:
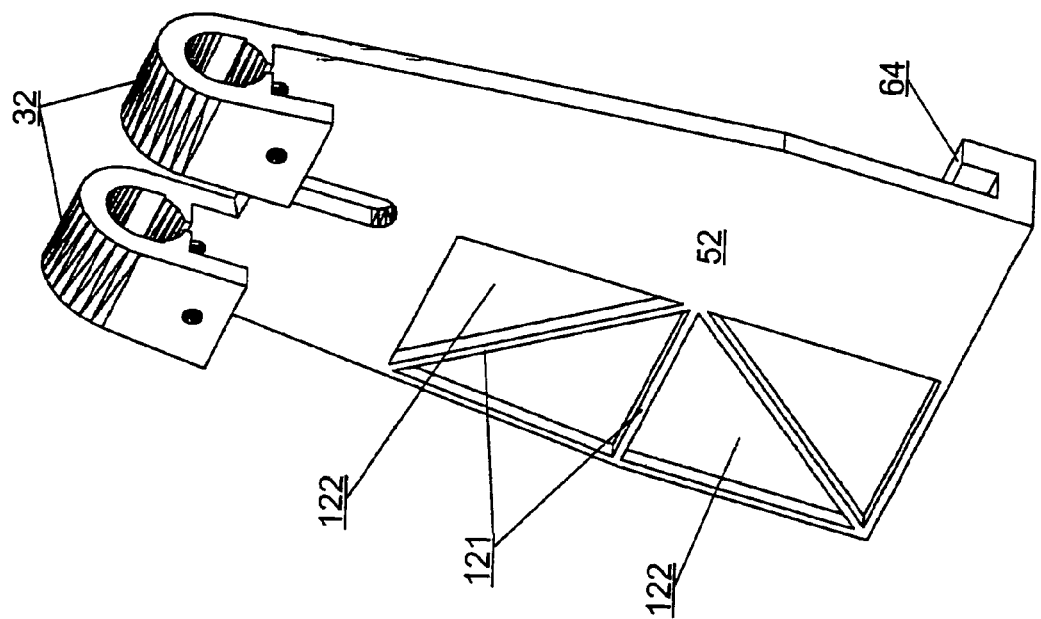
FIG. 9 is a perspective rear view of an additional embodiment of a carrier device having a frame of an alternative structure.
Figure 10:
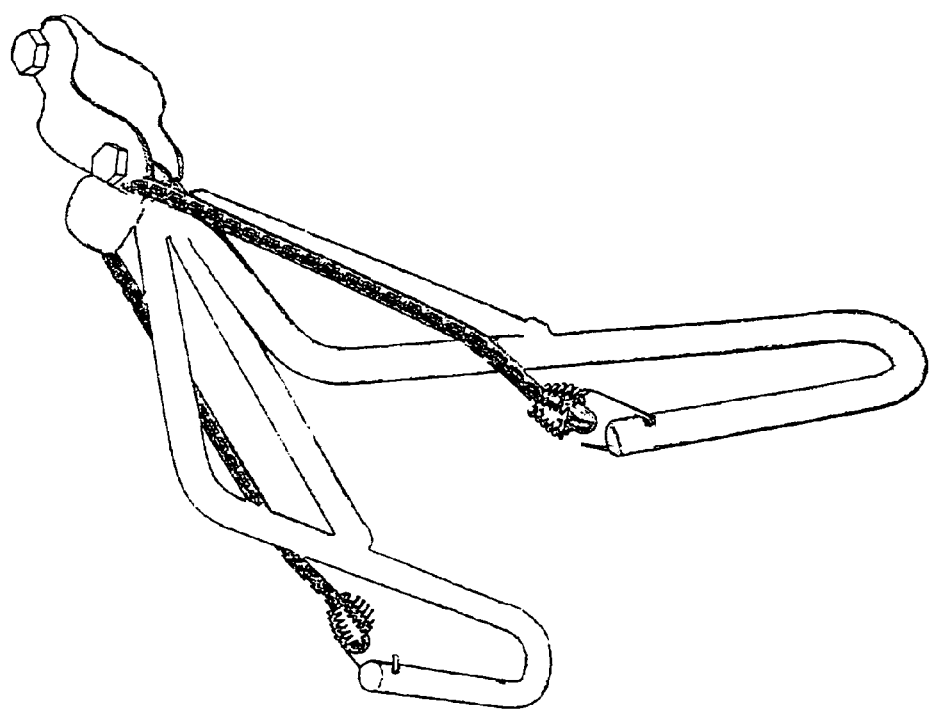
FIG. 10 is a perspective view of a prior art device.

Frame 52 generally has a width, W, generally measured perpendicular to the length, that extends a distance sufficient to prevent the board from wobbling, moving or the like and provide a stable surface to hold the board while secured or connected in carrier device 20. The width of frame 52 can vary along the length thereof and thus be provided with many different designs or configurations. Thus, the frame can be provided with many different shapes or forms and even include cut-outs of any shape or form within the structure of the frame itself. Frame 52 is provided with a maximum width that ranges generally from about 3 to about 12 inches, desirably from about 4 to about 9 inches, and preferably from about 5 to about 7 inches. In yet a further embodiment of the present invention, frame 52 can be provided with one or more elements 121 such as protrusions, ribs, or the like on any surface, preferably a back surface in order to provide strength thereto, such as illustrated in FIG. 9. Likewise, portions of the frame 52 can be removed or can have a cut-out, a recessed area 122, or the like in order to provide a pleasing aesthetic surface, or save on material costs, or the like. In a preferred embodiment, the frame length is greater than frame width.

Board bracket 50 includes a base 60 connected to frame 52 in which a portion of skateboard 100 rests due to gravitational forces when skateboard 100 is placed in carrier device 20. Base 60 includes a seat 62 formed by frame 52, spacer 63 and retainer 64. Seat 62 is generally an open holding element having a projection adapted to maintaining skateboard 100 in a secured position, in cooperation with the remaining structure. In a preferred embodiment, seat 62 is "C" or "U" shaped. Retainer 64 is generally an upward extending projection, lip, or rim that extends upward past the upper surface of spacer 63 in order to hold or maintain skateboard 100 in carrier device 20. Retainer 64, spacer 63, and/or frame 52 can be integrally formed, or separately formed and connected by any method, i.e. fastener, adhesive, weld, etc. At least one portion of retainer 64 extends, preferably vertically, a maximum distance generally from about 0.25 to about 2 inches, desirably from about 0.30 to about 1 inch, and preferably from about 0.40 to about 0.75 inch above the top or upper surface of spacer 63, such as shown in FIG. 3. The maximum thickness of spacer 63 between frame 52 and retainer 64 is generally from about 0.25 to about 4 inches, desirably from about 0.30 to about 2 inches, and preferably from about 0.40 to about 1 inch, and most preferably about 0.50 inch. In order to secure skateboard 100 in the carrier device 20, skateboard 100 is generally turned so that the length thereof is horizontal and one side of board 102 or 104 is inserted into seat 62 between frame 52 and retainer 64 in the front side or back side of skateboard 100 disposed against frame 52 such as shown in FIG. 5. Retainer 64 and spacer 63 generally extend the same width as frame 52 along base 60, but can be modified to extend more or less than the width of frame 52 at base 60 as desired by the fabricator.

Figure 6:
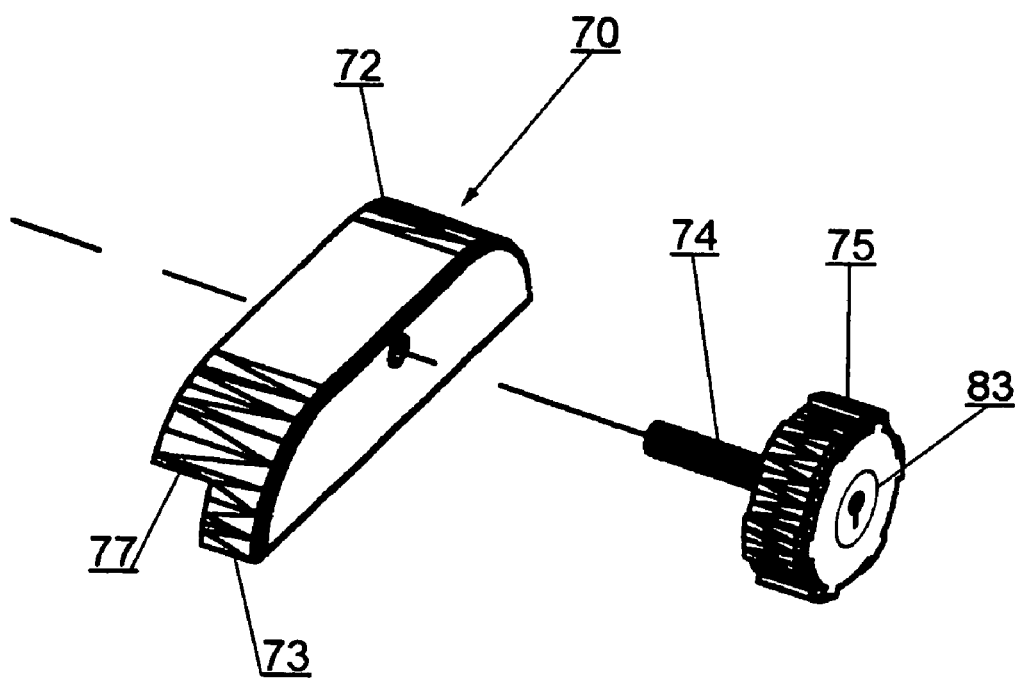
FIG. 6 is a perspective view of one embodiment of a portion of a securing mechanism of a carrier device of the present invention including a keyed locking mechanism utilized to prevent theft of a skateboard from the carrier device.
Figure 7:
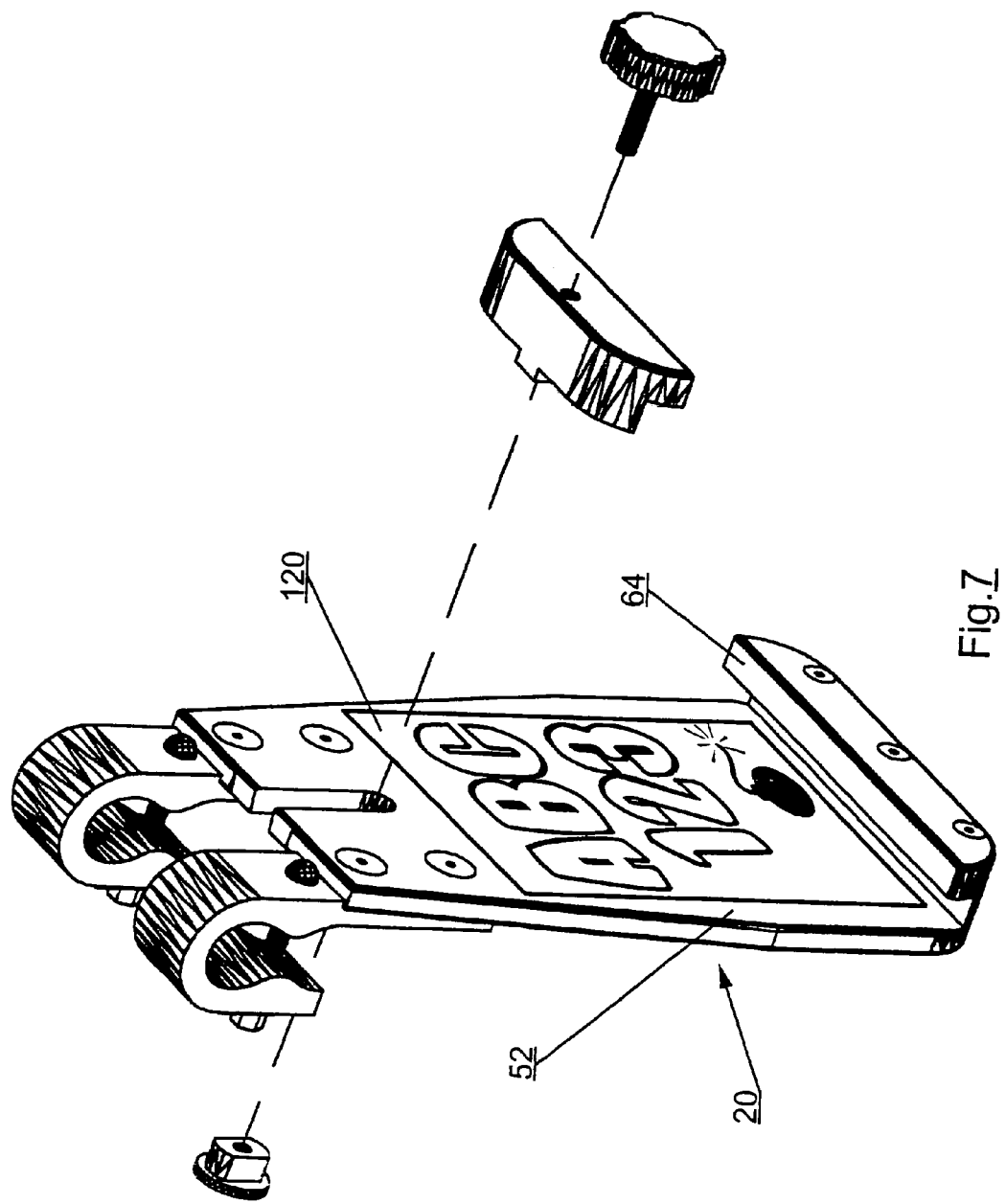
FIG. 7 is a perspective view of a further embodiment of a carrier device of the present invention including indicia on a surface of the frame.

In yet a further embodiment of the present invention, carrier device 20 includes indicia 120 such as letters, numbers, symbols, or combinations thereof at a location thereon, such as frame 52. Non-limiting examples of different types of indicia 120 are illustrated in FIG. 7. In a further embodiment, knob 75 is provided with a locking mechanism 83 such as a combination lock or a key lock as shown in FIG. 6 that is utilized to prevent a skateboard connected in the carrier device 20 from being removed from and/or stolen when the carrier device 20 is unattended.

As illustrated in FIG. 5, side 102 of skateboard 100 is connected to carrier device 20 by securing mechanism 70. Securing mechanism 70 is adjustable along a predetermined length of frame 52 in order to secure boards of various widths. As shown in FIG. 2, securing mechanism 70 includes a securing member 72 having a retainer 73 and spacer 77 that is utilized to maintain skateboard 100 in position against frame 52 and thus securely connected to carrier device 20.

Securing member 72, spacer 77 and/or retainer 73 each, independently, have a maximum width measured from end to end of generally from about 2 to about 8 inches, desirably from about 3 to about 7 inches, and preferably from about 3.5 to about 6 inches. The securing member 72 width is generally proportional to the width of the frame at a base thereof near spacer 62. In one preferred embodiment, the width of securing member 72 is about two-thirds the width of frame 52 at the bottom or base thereon. Retainer 73 is a rim or extension generally having a maximum height measured from a plane formed by the bottom surface of spacer 77 to the lower end thereof, as shown in FIG. 2, of generally from about 0.25 to about 2 inches, desirably from about 0.30 to about 1 inch, and preferably from about 0.40 to about 0.75 inch. The width of spacer 77 is generally coextensive with the width of retainer 73, but can be any suitable length. Securing member spacer 77 preferably has a maximum thickness which is equal to the thickness of spacer 63, that is, generally ranges from about 0.25 to about 4 inches, desirably from 0.30 to about 2 inches, and preferably from about 0.40 to about 1 inch, with about 0.50 inch most preferred.

Figure 8:
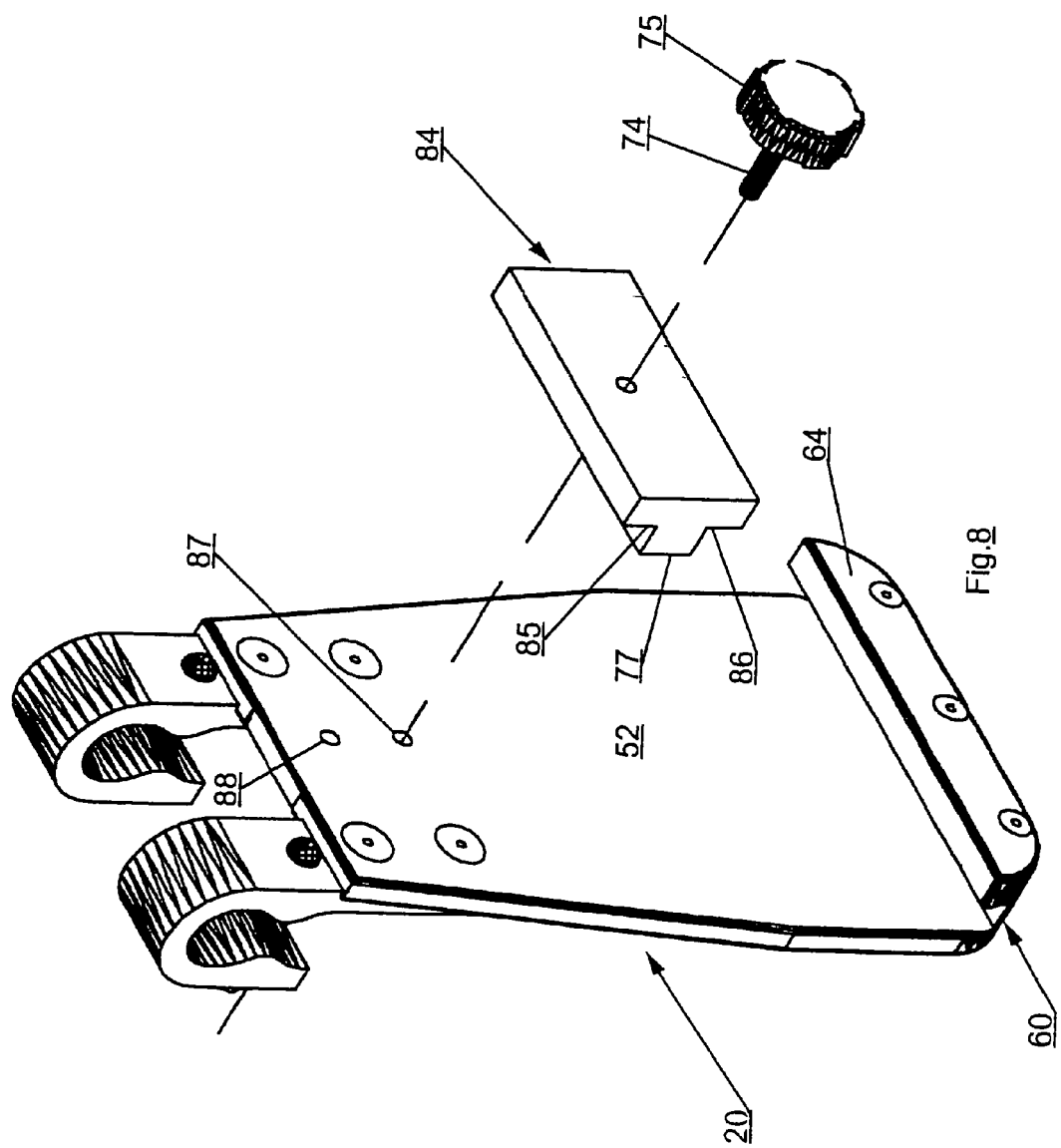
FIG. 8 is an exploded perspective view of a further embodiment of a carrier device of the present invention including a further embodiment of a securing member.

In yet a further embodiment of the present invention, securing member 72 includes a protrusion 71 as illustrated in FIG. 2 adapted to fit within frame slot 80 as described hereinbelow. Protrusion 71 prevents securing member 70 from twisting or turning in relation to frame 52 when located in slot 80. In yet another embodiment as illustrated in FIG. 8, securing member 72 is formed a substantially T-shaped securing member 84 as opposed to the substantially L-shaped member as illustrated in FIG. 2.

The T-shaped securing member includes a first retainer 85 and a second retainer 86 generally opposite first retainer 85. First retainer 85 has a maximum height that is different from, i.e., longer or shorter (as shown), than second retainer 86, as measured from a respective plane formed by an end of spacer 77. The retainers, 85 and 86, have different heights so that T-shaped securing member 84 can be rotated 180° to use either retainer to accommodate skateboards of different sizes, i.e. widths. The maximum height of each retainer 85, 86, independently, ranges generally from about 0.25 to about 2 inches, desirably from about 0.30 to about 1 inch, and preferably from about 0.40 to about 0.75 inch. The width of T-shaped securing member 84 can be the same as described for securing member 72 hereinabove. Knob 75 including fastener 74 is inserted through an aperture in T-shaped securing member 84 and subsequently through an aperture 87 in frame 52 in order to secure T-shaped securing member 84 to carrier device 20. Depending on the width of the skateboard to be secured within carrier device 20, either first retainer 85 or second retainer 86 is positioned facing base member 60 as illustrated in FIG. 8. An additional aperture 88 is provided in frame 52 in order to provide further adjustability to the carrier device. In some embodiments, the apertures 87, 88 of frame 52 are threaded and fastener 74 also includes threads in some embodiments.

Securing member 72 or T-shaped securing member 84 is secured to carrier device 20, preferably frame 52, utilizing a fastening mechanism. A preferred fastening mechanism is illustrated in FIG. 2, wherein fastener 74 is capable of extending through an aperture in securing member 72 and an aperture in frame 52 and being connected to nut 76. The aperture of frame 52 can be a hole as shown in FIG. 8, or a slot 80 as illustrated in FIG. 2. Slot 80 in one embodiment is connected to the upper end of frame 52 and has an end that is open. In other embodiments, slot 80 can be closed and located further down on frame 52. Slot 80 is preferably parallel to the length, L, of frame 52 but can be situated at other angles if desired. Slot 80 has a length generally from about 0.25 to about 4 inches, desirably from about 0.50 to about 3 inches, and preferably from about 1 to about 3 inches. For ease of use, fastener 74 is connected to knob 75 that is utilized to tighten or loosen the fastening mechanism. Nut 76 as illustrated in FIGS. 4A and 4B, includes a protrusion 78 having side surfaces 79 complimentary in shape to the side surfaces 81 of slot 80. As such, nut 76 is slidable in the channel of slot 80, but will not spin therein. The structure of the arrangement allows securing member 72 to be moved or adjusted in relation to frame 52 in order to be able to secure skateboards 100 of different widths. Another beneficial feature of the fastening mechanism is that the same is self-tightening without need for additional tools. As slidable protrusion 78 mates with and fits within slot 80, nut 76 is prevented from turning and during tightening, securing member 72 is drawn towards frame 52 and can be secured thereto in a desired position after a skateboard 100 is placed in carrier device 20. Flange 82 on nut 76 prevents the nut 76 from being drawn through slot 80.

One method for utilizing the carrier device 20 of the present invention is as follows. After the carrier device 20 has been installed in an appropriate location on an object such as a bicycle 10 as illustrated in FIG. 1 and described hereinabove, the carrier device 20 is ready for use. A portion of skateboard 100 is placed in seat 62 generally in contact with spacer 63. Generally, a side 102 or 104 of skateboard 100 is rested on spacer 77 of seat 62. The remaining side 102 or 104 of skateboard 100 is generally positioned against the upper end of frame 52. Securing member 72 or 84 is lowered or positioned onto the side 102 or 104 of skateboard 100 capturing the side between frame 52, spacer 77 and retainer 73, 85, or 86. Knob 75 is turned and fastener 74 is drawn into nut 76, aperture 87, or 88. The knob is turned until the board is securely fastened to carrier device 20.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A skateboard carrier device for a bicycle, comprising:
    a clamp member adapted to connect the carrier device to the bicycle;
    a substantially planar frame connected to the clamp member, wherein the frame includes a seat connected thereto at a lower end portion of the frame and adapted to receive and hold a side of the skateboard; and
    a securing mechanism adjustably secured to an aperture of the frame, wherein the securing mechanism is capable of being secured at a plurality of positions with respect to the frame and adapted to secure a skateboard to the carrier device, wherein the mechanism includes a securing member having an aperture and a fastener that extends through the securing member aperture and a frame aperture adjustably connects the securing mechanism to the frame, wherein the frame aperture is a slot, and wherein an element of the securing mechanism is moveable in the slot in order to adjust a distance between the seat and the securing mechanism.

2. The device according to claim 1, wherein the fastener is removably secured to a nut, wherein the nut includes a protrusion that extends from a flange of the nut and fits within the frame slot, and wherein the flange has a width greater than the slot to prevent the nut from being drawn through the slot.

3. The device according to claim 2, wherein the securing member is substantially L-shaped or T-shaped and includes a spacer and a retainer adapted to secure the skateboard to the carrier device, and wherein the spacer is disposed between the frame and the retainer when the securing mechanism is secured to the frame.

4. The device according to claim 1, wherein the securing member is substantially L-shaped or T-shaped and includes a spacer and a retainer adapted to secure the skateboard to the carrier device, and wherein the spacer is disposed between the frame and the retainer when the securing mechanism is secured to the frame.

5. The device according to claim 1, wherein the frame has a maximum length of from about 4 to about 12 inches, and a maximum width of about 3 to about 12 inches.

6. The device according to claim 3, wherein the frame has a maximum length of from about 4 to about 12 inches, and a maximum width of about 3 to about 12 inches, wherein the seat has a spacer, wherein the seat spacer and securing member spacer, independently, has a maximum thickness from about 0.25 to about 4 inches, and wherein the seat retainer and the securing member retainer, independently, extend a maximum distance from the spacer connected thereto of from about 0.25 to about 2 inches.

7. The device according to claim 6, wherein the frame length is from about 6 to about 9 inches, and the width is about 5 to about 7 inches, with a proviso that the length is greater than the width.

8. The device according to claim 1, wherein the carrier device includes indicia on a surface thereof, or a locking mechanism, or combinations thereof.

9. The device according to claim 5, wherein the seat includes a seat spacer connected to the frame and a seat retainer connected to the seat spacer, wherein the seat retainer extends above a plane extending through an upper surface plane of the spacer a maximum distance of about 0.25 to about 2 inches.

10. A carrier device for a bicycle or transport vehicle, comprising:
    a clamp member adapted to be connected to the bicycle or transport vehicle;
    a frame having a first end and a second end, wherein a seat is connected to the first end of the frame, wherein the seat includes a spacer connected to the frame and a retainer connected to the spacer and spaced a distance from the frame by the spacer, wherein the retainer has a height greater than the spacer, wherein the seat forms an opening capable of receiving a portion of an object, wherein the second end of the frame includes an aperture to which a securing mechanism is secured, wherein the securing mechanism is capable of being secured to a plurality of positions in relation to the frame utilizing the aperture, wherein the securing mechanism is adapted to secure a second portion of the object to the carrier device, wherein the securing member is substantially L-shaped or T-shaped and includes a spacer and a retainer adapted to secure the skateboard to the carrier device, wherein the spacer is disposed between the frame and the retainer when the securing mechanism is secured to the frame, wherein the frame aperture is a slot, and wherein an element of the securing mechanism is moveable in the slot in order to adjust a distance between the seat and the securing mechanism.

11. The device according to claim 10, wherein the fastener is removably secured to a nut, wherein the nut includes a protrusion that extends from a flange of the nut and fits within the frame slot, and wherein the flange has a width greater than the slot to prevent the nut from being drawn through the slot.

12. The device according to claim 11, wherein the frame has a maximum length of from about 4 to about 12 inches, and a maximum width of about 3 to about 12 inches, wherein the seat has a spacer, wherein the seat spacer and securing member spacer, independently, has a maximum thickness from about 0.25 to about 4 inches, and wherein the seat retainer and the securing member retainer, independently, extend a maximum distance from the spacer connected thereto of from about 0.25 to about 2 inches.

13. The device according to claim 12, wherein the carrier device includes indicia on a surface thereof, or a locking mechanism, or combinations thereof.

14. The device according to claim 10, wherein the frame has a maximum length of from about 4 to about 12 inches, and a maximum width of about 3 to about 12 inches, wherein the seat spacer and securing member spacer, independently, has a maximum thickness from about 0.25 to about 4 inches, and wherein the seat retainer and the securing member retainer, independently, extend a maximum distance from the spacer connected thereto of from about 0.25 to about 2 inches.

15. A skateboard carrier device for a bicycle, comprising:
    a clamp member adapted to connect the carrier device to a bicycle;
    a frame connected to the clamp member, wherein the frame includes a seat connected thereto at a base of the frame and adapted to receive and hold the skateboard; and a securing mechanism having a T-shaped or L-shaped securing member adjustable in relation to the frame and capable of being secured to an upper portion of the frame at a plurality of different positions and adapted to accommodate skateboards of different configurations, wherein the securing member is secured to a frame aperture that is a slot, wherein an element of the securing mechanism is moveable in the slot in order to adjust a distance between the seat and the securing mechanism, wherein the fastener is removably secured to a nut, wherein the nut includes a protrusion that extends from a flange of the nut and fits within the frame slot, and wherein the flange has a width greater than the slot to prevent the nut from being drawn through the slot, wherein the securing member includes a spacer and a retainer adapted to secure the skateboard to the carrier device, and wherein the spacer is disposed between the frame and the retainer when the securing mechanism is secured to the frame.

16. The skateboard according to claim 15, wherein the frame has a maximum length of from about 4 to about 12 inches, and a maximum width of about 3 to about 12 inches, wherein the seat has a spacer, wherein the seat spacer and securing member spacer, independently, has a maximum thickness from about 0.25 to about 4 inches, and wherein the seat retainer and the securing member retainer, independently, extend a maximum distance from the spacer connected thereto of from about 0.25 to about 2 inches.

* * * * *